United States Patent
Thompson et al.

(10) Patent No.: US 8,628,639 B2
(45) Date of Patent: Jan. 14, 2014

(54) VACUUM BAG PROCESSING USING DUAL SEALS

(75) Inventors: Michael P. Thompson, Tacoma, WA (US); Michael R. Anderson, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/118,415

(22) Filed: May 28, 2011

(65) Prior Publication Data

US 2012/0298296 A1  Nov. 29, 2012

(51) Int. Cl.
*B32B 37/10* (2006.01)
*B29C 70/44* (2006.01)

(52) U.S. Cl.
USPC ........... 156/285; 156/286; 156/287; 264/511; 264/553; 264/554; 264/571

(58) Field of Classification Search
USPC .......... 156/285–287, 381, 382; 264/511, 553, 264/554, 571
See application file for complete search history.

(56) References Cited

U.S. PATENT DOCUMENTS

| | | | |
|---|---|---|---|
| 4,357,193 A * | 11/1982 | McGann et al. | 156/286 |
| 4,822,651 A * | 4/1989 | Newsom | 428/36.8 |
| 5,087,193 A | 2/1992 | Herbert, Jr. | |
| 5,236,646 A | 8/1993 | Cochran et al. | |
| 5,665,301 A | 9/1997 | Alanko | |
| 6,017,484 A * | 1/2000 | Hale | 264/510 |
| 6,299,819 B1 | 10/2001 | Han | |
| 6,761,783 B2 | 7/2004 | Keller et al. | |
| 7,186,367 B2 | 3/2007 | Hou et al. | |
| 7,413,694 B2 | 8/2008 | Waldrop, III et al. | |
| 7,524,389 B2 | 4/2009 | Elbs et al. | |
| 7,849,729 B2 | 12/2010 | Miller et al. | |
| 7,857,925 B2 | 12/2010 | Keller et al. | |
| 7,862,679 B2 | 1/2011 | Kulesha | |
| 8,105,068 B2 | 1/2012 | Ross et al. | |
| 2005/0253309 A1 | 11/2005 | Hou et al. | |
| 2005/0281980 A1 * | 12/2005 | Cruz et al. | 428/131 |
| 2007/0296126 A1 * | 12/2007 | Audette | 264/571 |
| 2008/0048369 A1 | 2/2008 | Kulesha | |
| 2008/0308210 A1 | 12/2008 | Keller et al. | |
| 2010/0112117 A1 | 5/2010 | Ross et al. | |
| 2010/0308515 A1 | 12/2010 | Green | |
| 2011/0146906 A1 | 6/2011 | Anderson et al. | |

FOREIGN PATENT DOCUMENTS

| | | |
|---|---|---|
| WO | WO0071329 A1 | 11/2000 |
| WO | 2008045485 A2 | 4/2008 |
| WO | 2011075252 A1 | 6/2011 |

OTHER PUBLICATIONS

International Search Report, dated May 9, 2011, regarding Application No. PCT/US2010/056605 (WO2011075252), 4 pages (09-0792PCT).

USPTO Office Action, dated Aug. 24, 2011, regarding U.S. Appl. No. 12/641,897, 10 pages.

(Continued)

*Primary Examiner* — Christopher Schatz
(74) *Attorney, Agent, or Firm* — Yee & Associates, P.C.

(57) ABSTRACT

Apparatus for processing a workpiece comprises a base adapted to have a workpiece placed thereon. A vacuum bag is placed over the workpiece, and the bag is sealed to the base using inner and outer seals. The inner and outer seals are spaced apart from each other to form a channel therebetween. A vacuum port coupled with a vacuum source is used to evacuate air from the channel.

12 Claims, 3 Drawing Sheets

(56) References Cited

OTHER PUBLICATIONS

USPTO Final Office Action, dated Jan. 26, 2012, regarding U.S. Appl. No. 12/641,897, 9 pages.

EP search report dated Sep. 25, 2012 regarding application 121620100.8-1253, reference NAM/P121508EP00, applicant The Boeing Company, 7 pages.

* cited by examiner

VACUUM BAG PROCESSING USING DUAL SEALS

CROSS REFERENCE TO RELATED APPLICATIONS

This application is related to co-pending U.S. patent application Ser. No. 12/641,897 filed Dec. 18, 2009, the entire disclosure of which is incorporated by reference herein.

TECHNICAL FIELD

This disclosure generally relates to vacuum bag processing of composite parts, and deals more particularly with the use of dual seals to improve sealing of a vacuum bag to a tool.

BACKGROUND

Vacuum bag processing may be used to consolidate and/or cure composite parts, either within or outside an autoclave. The part is placed on a tool and covered by a vacuum bag which is then sealed to the tool using a polymeric sealer, normally in the form of a sealant tape. The sealed bag forms a vacuum tight enclosure which is evacuated during an initial heat-up phase to remove air and volatiles from the part. In a subsequent cure phase, the part is then heated to a cure temperature in order to consolidate and cure the resin component of the part.

More recently, a double vacuum bag technique has been developed in which an outer vacuum bag is placed over an inner bag and sealed to the tool. During the heat-up, a vacuum is drawn on the outer bag in order to reduce the amount of atmospheric pressure applied to the part through the inner bag. This reduction in pressure allows air and volatiles to escape from the part more freely, which in turn may reduce porosities in the cured part. Following this heat-up phase, the outer bag is vented to the atmosphere so that full atmospheric pressure is applied to the part while it is being cured.

The polymeric materials used as the sealant may have the tendency to expand and out-gas when heated. In the case of the double vacuum bag processing described above, when the outer bag is vented to atmosphere, the heated sealant is exposed to incoming air, causing the sealant to foam and form porosities in the bag seal. The presence of porosities in the sealant may allow air to permeate the bag seal, resulting in a reduction of bag vacuum that may affect part quality.

Accordingly, there is a need for a method of reducing or eliminating vacuum bag leaks due air permeation through vacuum bag seals. There is also a need for a method of double vacuum bag processing that protects an inner bag seal against loss of vacuum integrity.

SUMMARY

The disclosed embodiments provide a method and apparatus for vacuum bag processing of composite parts that may reduce or eliminate vacuum bag leaks due to loss of bag sealant vacuum integrity. Use of the disclosed method may reduce scrap due to bag sealant vacuum leaks, and may improve part quality by reducing part porosities.

According to one disclosed embodiment, apparatus is provided for processing a workpiece comprising a base adapted to have a workpiece placed thereon. At least a first vacuum bag is adapted to cover the workpiece for processing the workpiece, and inner and outer seals are provided for sealing the first bag to the base around the workpiece. The inner and outer seals are spaced apart from each other to form a channel therebetween. A vacuum port is coupled with the channel and is adapted to be coupled with a vacuum source that evacuates air from the channel, thereby reducing or eliminating exposure of the inner seal to the surrounding atmospheric air. Each of the inner and outer seals extends substantially around the entire perimeter of the workpiece. The apparatus further comprises a breather disposed within the channel and extending substantially completely around the inner seal. The breather may comprise a strip of air permeable material having sufficient strength to hold the inner bag in spaced relationship to the base. The apparatus may further comprise a second bag covering the first bag, and a second bag seal for sealing the second bag to the base around the outer periphery of the outer seal.

According to another disclosed embodiment, an apparatus comprises a tool adapted to having composite part placed thereon and a vacuum bag to be adapted to be placed over the part and have a vacuum drawn therein. An inner seal is provided for sealing the bag against the tool around the part. An outer seal surrounds the inner seal for sealing the bag to the tool. The outer seal is laterally spaced from the inner seal to form a channel between the inner and outer seals. A breather disposed within the channel allows air to pass through the channel, and a vacuum port is coupled with the channel for evacuating air from the channel. The apparatus may further include a shroud sealed to the tool and covering the bag in the area of the inner and outer seals. A vacuum source is coupled with the shroud for evacuating air from the shroud to relieve pressure on the bag. Each of the inner and outer seals may comprise a polymeric material that expands and foams when subjected to heat and air at or below ambient pressures.

According to a further embodiment, a method of processing a workpiece comprises placing the workpiece on a base, placing at least a first vacuum bag over the workpiece on the base, and forming an inner seal between the bag and the base around the workpiece. The method further includes forming an outer seal between the bag and the base around the first seal, including forming a channel between the inner and outer seals. The method also includes evacuating air from the channel. The channel may be formed between the inner and outer seals by laterally spacing the outer seal from the inner seal. The method may further comprise placing a second vacuum bag over the first vacuum bag and sealing the second bag to the base around the entire periphery of the workpiece. The method may also include drawing a vacuum in the second bag to relieve pressure applied to the workpiece through the first bag, and venting the second bag to the atmosphere.

According to still another embodiment, a method is provided of double vacuum bag processing a composite part. The part is placed on the tool and an inner vacuum bag is placed over the part. The inner bag is sealed to the tool around the part using inner and outer spaced apart seals between the inner bag and the tool. A breather is placed in a channel between the inner and outer seals. An outer vacuum bag is placed over the part and sealed to the tool. A vacuum is drawn in the inner bag and atmospheric pressure on the inner bag is reduced by drawing a vacuum within the outer bag. The vacuum within the outer bag is relieved by venting the outer bag to the atmosphere. The outer seal is used to protect the inner seal from exposure to air entering the outer bag when the outer bag is vented to the atmosphere.

According to another embodiment, a method is provided of driving out volatiles from a composite part layup. The method comprises placing the layup on a tool, covering the layup with a first vacuum bag, forming a double vacuum seal between the first vacuum bag and the tool, and drawing a vacuum within the first bag. The method further comprises placing a second vacuum bag over the first bag and drawing a vacuum in the second bag. The vacuum in the second bag is used to limit the amount of pressure applied to the layup through the first bag. The layup is heated while being subjected to the limited amount of pressure through the first bag. Forming the double seal may include forming first and second seals between the first bag and the tool around the periphery of the layup, and forming a channel around the layup between the first and second seals. The method may further comprise evacuating air from the channel while limiting the amount of pressure being applied to the layup through the first bag.

BRIEF DESCRIPTION OF THE ILLUSTRATIONS

DETAILED DESCRIPTION

Figure 1:
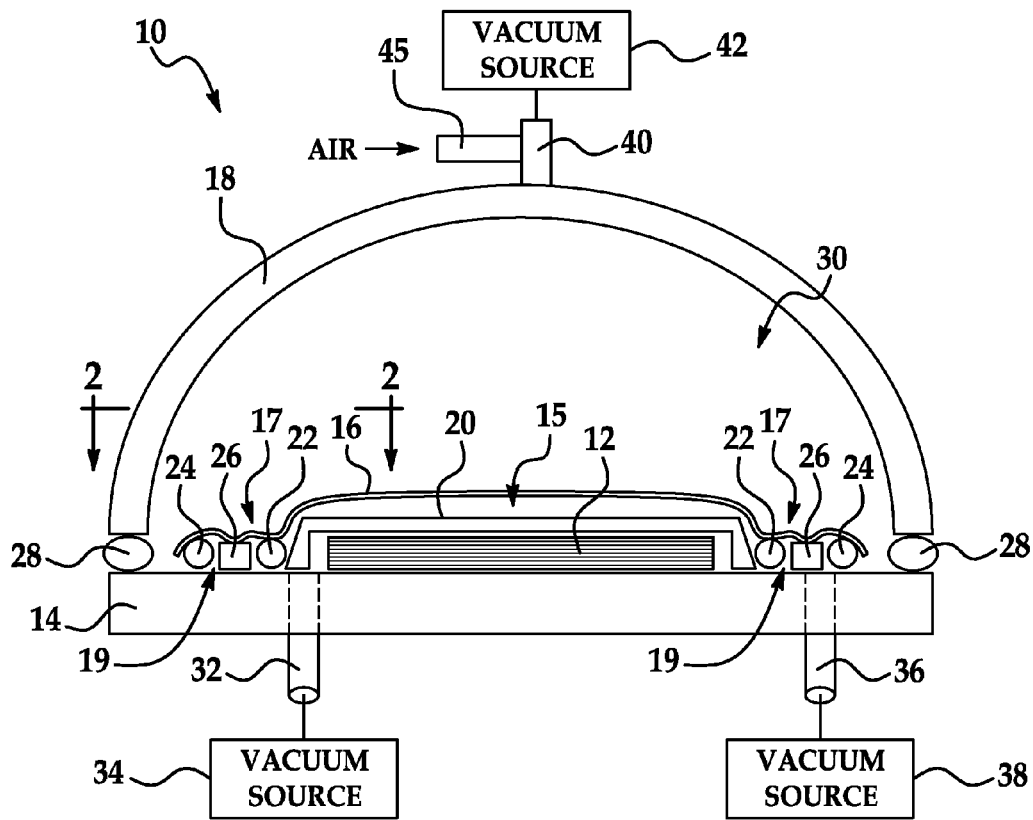
FIG. 1 is an illustration of a cross sectional view of apparatus for double vacuum bag processing of composite parts using dual vacuum bag seals according to the disclosed embodiments.
Figure 2:
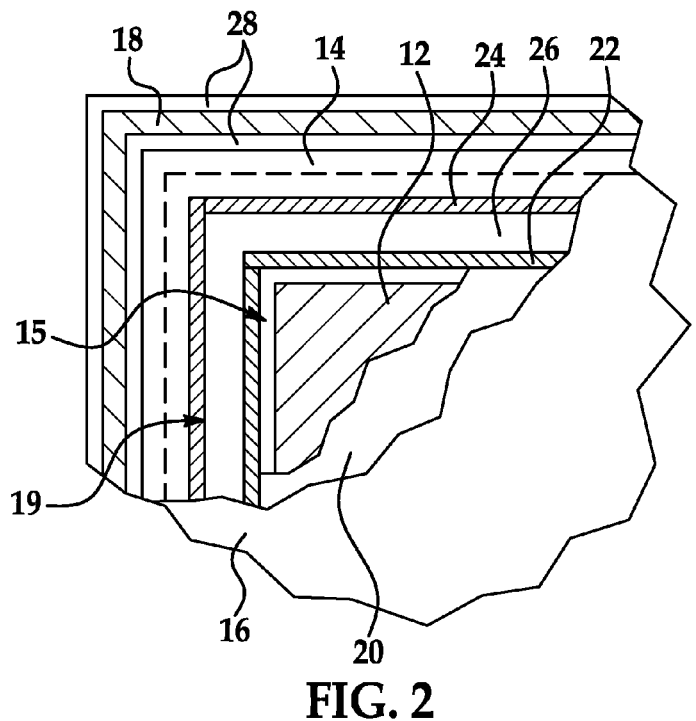
FIG. 2 is a sectional view at the corner of the apparatus shown in FIG. 1, taken in the area shown at "FIG. 2" in FIG. 1.

Referring first to FIGS. 1 and 2, apparatus generally indicated by the numeral 10 may be used to process a part or workpiece, such as a multi-ply composite part layup 12. The part layup 12 may form part of a layup assembly 15 that may include a breather 20 as well as other components such as release films (not shown), a caul plate (not shown), etc. The part layup 12 is supported on and is compacted against a base that may comprise a tool 14. In the illustrated example, the tool 14 is substantially flat, however in other embodiments the tool 14 may have contours or other features (not shown) that are used to form the part layup 12 into a desired shape.

The apparatus 10 further comprises an inner vacuum bag 16 and an outer vacuum bag 18. The inner bag 16 may comprise a flexible, non-permeable material such as, without limitation, nylon which may or may not be reusable. The outer periphery 17 of the inner bag 16 is sealed to the tool 14 by inner and outer seals 22, 24 respectively which extend around the entire periphery of the part layup 12 and form vacuum tight dual seals between the inner bag 16 and the tool 14. The outer seal 24 is spaced laterally outboard from the inner seal 22 to form a channel 19 that extends around the entire periphery of the bag 16. A breather 26 is disposed within the channel 19 around the periphery of the part layup 12. The breather 26 may comprise strips of a conventional breather material that is porous to allow air flow freely therethrough and has sufficient structural strength to hold the inner bag 16 in spaced relationship to the tool 14.

Each of the inner and outer seals 22, 24 may comprise conventional, commercially available strips of tacky bag edge sealant tape formed of polymeric materials. This sealant tape may be subject to out-gassing when heated, which may cause the sealant tape to expand and foam under certain conditions when heated and exposed to ambient air and/or sub-ambient pressure.

In the illustrated embodiments, the outer bag 18 is shown as a substantially rigid, dome shaped shroud, alternatively however, the outer bag 18 may comprise other forms of a cover, such as a flexible bag-like material which may be substantially the same or different than the material used as the inner bag 16. The outer bag 18, sometimes hereafter referred to as a shroud or a cover, is sealed to the tool 14 by a sealant 28 and forms a vacuum chamber 30 over the bag 16. The air may be evacuated from the chamber 30 formed by the outer bag 18 by means of a port 40 coupled with a suitable vacuum source 42. The port 40 may be selectively coupled to the ambient atmosphere by means of a vent 45 which allows air to re-enter the vacuum chamber 30 during a later discussed cure phase of the process. The air inside the inner bag 16 may be evacuated through a vent port 32 in the base 14, which is coupled with a suitable vacuum source 32. Any air that may enter the sealed channel 19 may be evacuated using a vacuum source 38 that is coupled with the channel 19 through a vent port 36 in the base 14.

Figure 3:
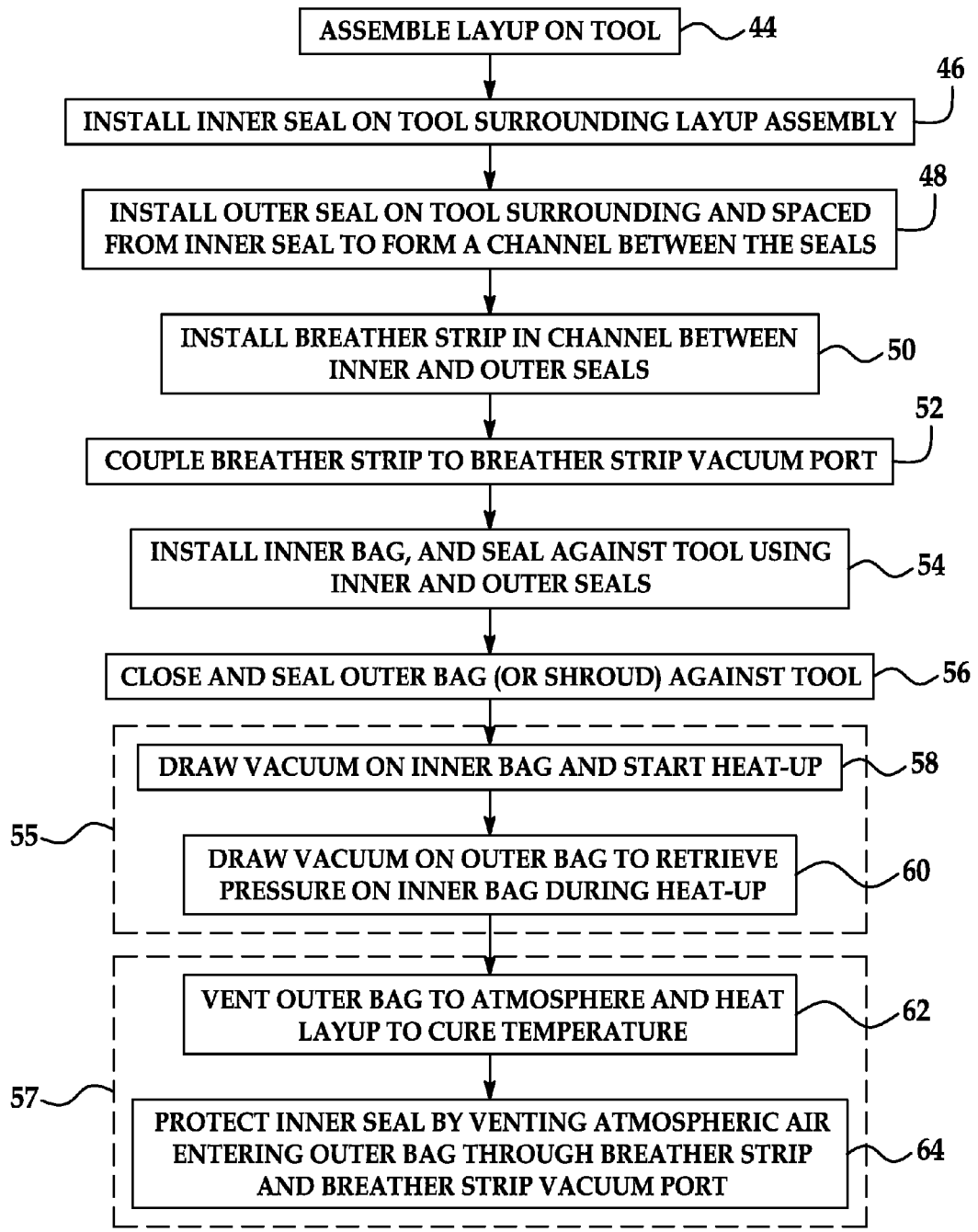
FIG. 3 is an illustration of a flow diagram of a method of vacuum bag processing composite parts.

Attention is now directed to FIG. 3 which broadly illustrates the overall steps of a method for double bag processing a part or workpiece, such as the composite part layup 12 (FIGS. 1 and 2). Beginning at 44, a layup assembly 15 is placed or assembled on a tool 14, which includes a part layup 12 along with a breather 20 and other components as required, in preparation for processing. At 46, the inner seal 22 is placed on the tool 14 surrounding the layup assembly 15. The inner seal 22 may be installed by adhesively attaching strips of a conventional sealant tape to the tool 14 at locations where the inner bag 16 is to be sealed to the tool 14. At step 48, the outer seal 24 is installed on the tool 14 but in spaced relationship to the inner seal 22 so as to form a channel 19 that extends around the entire periphery of the layup assembly. The outer seal 24 may also comprise sealant tape that is adhesively applied or tacked down onto the tool 14, similar to the inner seal 22.

At step 50, the breather 26 is placed in the channel 19 between the inner and outer seals 22, 24 respectively. The breather 26 may comprise one or more strips of conventional breather material which are laid substantially end-to-end in the channel 19. At step 52 the channel 19 and breather 26 are coupled through vent port 36 to vacuum source 38. At this point, as best seen in FIG. 2, the inner bag 16 has been installed over the layup assembly 15 and its outer periphery sealed to the tool 14 by means of the inner and outer seals 22, 24. Next, at 56, the outer bag 18 or shroud is placed over the inner bag 16 and is sealed to the tool 14 by means of seal 28.

The apparatus 10 having been loaded and readied for part processing in steps 44-56, the part layup 15 undergoes a heat-up phase 55 followed by a cure phase 57. In the heat-up phase 55, beginning with step 58, a vacuum is drawn on the inner bag 16 using vacuum source 32 which evacuates air from the bag 16 through vent port 32. In order to limit the amount of atmospheric pressure applied to the part layup 12 by the bag 16, a vacuum is drawn on the outer bag 18 at step 60, using the vacuum source 42, thereby reducing the pressure being applied to the inner bag 16 by a desired amount. This reduction of pressure on the bag 16 in step 60 allows air and volatiles to flow through the part layup 12 and escape more easily and more quickly. During the heat-up phase 55, while air and volatiles are being drawn from the part layup 12, the part layup 12 is heated to an intermediate temperature to assist in driving out volatiles from the part layup 12.

Following the heat-up phase 55, the cure phase 57 is initiated which begins with venting the outer bag 18 to the atmosphere through port 40 at step 62. As the outer bag 18 is vented to the atmosphere, air enters the bag 18, causing full atmospheric pressure to be applied to the part layup 12 through inner bag 16, which assists in consolidating the part layup 12 during curing. The outer seal 24 functions to substantially prevent air entering the outer bag 18 from reaching the inner seal 22. In some cases, the combination of heat and exposure to air may cause the outer seal 24 to expand and foam, which may result in some porosities being formed in the outer seal 24. In cases where these porosities may be severe enough to allow air to permeate the seal 24, air entering the channel 19 through the outer seal 24 is drawn through the breather 26 in channel 19 by the vacuum source 38 and is evacuated through the vent port 36. Thus, the inner seal 22 is protected against exposure to any of substantial amounts of air that could adversely affect its vacuum integrity as a result of the presence of the outer seal 24 and the evacuation of any air entering the channel 19.

With full atmospheric pressure being applied to the inner bag 16 as a result of venting the outer bag 18 to the atmosphere through vent port 40, the part layup 12 is heated to full cure temperature in step 62. As previously mentioned, and shown at 64, the inner seal 22 is protected against exposure to any substantial amounts of air until the part layup 12 is fully cured, due to the continuous application of a vacuum to the channel 19 during the cure phase 57.

It should be mentioned here that while a double bag processing technique has been illustrated, the disclosed dual bag seals 22, 24 and evacuated channel 19 may be advantageously used in vacuum bag apparatus and methods that use only a single bag to process composite parts.

Figure 4:
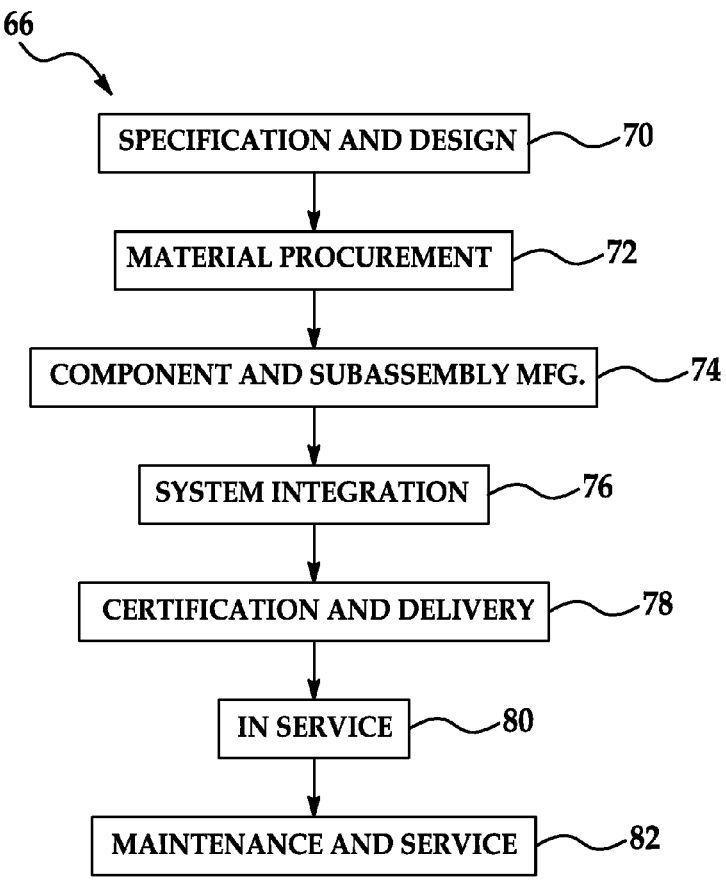
FIG. 4 is an illustration of a flow diagram of aircraft production and service methodology.
Figure 5:
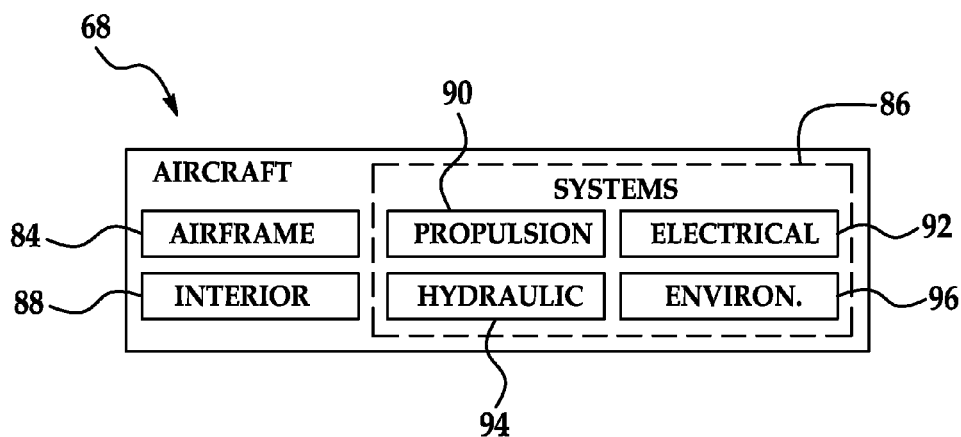
FIG. 5 is an illustration of a block diagram of an aircraft.

Embodiments of the disclosure may find use in a variety of potential applications, particularly in the transportation industry, including for example, aerospace, marine and automotive applications. Thus, referring now to FIGS. 4 and 5, embodiments of the disclosure may be used in the context of an aircraft manufacturing and service method as shown in FIG. 4 and an aircraft 68 as shown in FIG. 5. Aircraft applications of the disclosed embodiments may include a wide variety of structural composite parts and components, including for example and without limitation, control surface skins, wing and empennage skins, stiffened access doors and panels, and stiffened ribs and spar webs, to name only a few. During pre-production, exemplary method 66 may include specification and design 70 of the aircraft 68 and material procurement 72. During production, component and subassembly manufacturing 74 and system integration 76 of the aircraft 68 takes place. Thereafter, the aircraft 68 may go through certification and delivery 78 in order to be placed in service 80. While in service by a customer, the aircraft 68 is scheduled for routine maintenance and service 82 (which may also include modification, reconfiguration, refurbishment, and so on).

Each of the processes of method 66 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 5, the aircraft 68 produced by exemplary method 66 may include an airframe 84 with a plurality of systems 86 and an interior 88. Examples of high-level systems 86 include one or more of a propulsion system 90, an electrical system 92, a hydraulic system 94, and an environmental system 96. Any number of other systems may be included. The disclosed method may be employed to fabricate composite parts, structures and components used in the interior 88 and in the airframe 84. Although an aerospace example is shown, the principles of the disclosure may be applied to other industries, such as the marine and automotive industries.

Systems and methods embodied herein may be employed during any one or more of the stages of the production and service method 66. For example, parts, structures and components corresponding to production process 74 may be fabricated or manufactured in a manner similar to parts, structures and components produced while the aircraft 66 is in service. Also the disclosed method embodiments may be utilized during the production stages 74 and 76, for example, by substantially expediting assembly of or reducing the cost of an aircraft 66. Similarly, one or more of apparatus embodiments, method embodiments, or a combination thereof may be utilized while the aircraft 66 is in service, for example and without limitation, to maintenance and service 82.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of processing a workpiece, comprising:
   placing the workpiece on a base;
   placing a first vacuum bag over the workpiece on the base;
   forming an inner seal between the first vacuum bag and the base around the workpiece;
   forming an outer seal between the first vacuum bag and the base extending around the inner seal, including forming a channel between the inner seal and the outer seal, the inner seal and the outer seal comprising a polymeric material prone to out-gassing when heated under ambient or near-ambient conditions;
   evacuating air from the channel;
   placing a second vacuum bag over the first vacuum bag;
   sealing the second bag to the base around an entire periphery of the workpiece;
   drawing a vacuum in the second vacuum bag to relieve pressure applied to the workpiece by the first vacuum bag; and
   venting the second vacuum bag to an atmosphere.

2. The method of claim 1, wherein forming the channel between the inner seal and the outer seal includes laterally spacing the outer seal from the inner seal.

3. The method of claim 1, further comprising:
   compressing the workpiece by drawing a vacuum within the first vacuum bag.

4. The method of claim 1, further comprising:
   supporting the first vacuum bag above the base between the inner seal and the outer seal by placing a breather in the channel.

5. The method of claim 1, wherein evacuating air from the channel includes coupling the channel with a vacuum source.

6. A method of double vacuum bag processing a composite part, comprising:
   placing the composite part on a tool;
   placing an inner vacuum bag over the part;
   sealing the inner bag to the tool around the part, including forming seals between the inner vacuum bag and the tool, wherein seals comprise an inner seal and an outer seal which are spaced apart, the inner seal and the outer seal comprising a polymeric material prone to out-gassing when heated under ambient or near-ambient conditions;
   placing a breather in a channel between the inner seal and the outer seal;
   placing an outer vacuum bag over the part;

sealing the outer vacuum bag to the tool;
drawing a first vacuum within the inner bag;
reducing atmospheric pressure on the inner vacuum bag by drawing a second vacuum within the outer vacuum bag;
relieving the second vacuum within the outer vacuum bag by venting the outer vacuum bag to an atmosphere; and
using the outer seal to protect the inner seal from exposure to air entering the outer vacuum bag when the outer vacuum bag is vented to the atmosphere.

7. The method of claim 6, wherein:
forming the inner seal and the outer seal is performed by placing strips of the polymeric material on the tool in spaced relation to each other and adhering the inner vacuum bag to the strips, and
placing the breather in the channel includes installing strips of breather material on the tool between the inner seal and the outer seal.

8. The method of claim 6, further comprising:
heating the part to a first temperature while the second vacuum is being drawn on the outer vacuum bag, and
heating the part to a cure temperature higher than the first temperature after the second vacuum on the outer bag has been relieved.

9. A method of driving out volatiles from a layup, comprising:
placing the layup on a tool;
covering the layup with a first vacuum bag;
forming a double vacuum seal between the first vacuum bag and the tool by forming first and second seals between the first vacuum bag and the tool around a periphery of the layup and forming a channel around the layup between the first seal and the second seal, the first seal and the second seal comprising a polymeric material prone to out-gassing when heated under ambient or near-ambient conditions;
drawing a first vacuum within the first vacuum bag;
placing a second vacuum bag over the first vacuum bag;
drawing a second vacuum in the second vacuum bag;
using the second vacuum in the second vacuum bag to limit pressure applied to the layup through the first vacuum bag;
heating the layup while the layup is being subjected to a limited amount of pressure through the first vacuum bag; and
removing volatiles from the layup while the limited amount of pressure is being applied to the layup through the first vacuum bag.

10. The method of claim 9, further comprising:
evacuating air from the channel while the limited amount of pressure is being applied to the layup through the first vacuum bag.

11. The method of claim 1, wherein evacuating air from the channel comprises evacuating the channel through a vent port in the base, the vent port extending through a bottom face of the base.

12. The method of claim 1, wherein the inner seal and outer seal comprise strips of sealant tape formed of the polymeric material.

* * * * *